(12) United States Patent
Siegel et al.

(10) Patent No.: US 7,580,890 B2
(45) Date of Patent: Aug. 25, 2009

(54) SYSTEM AND METHOD FOR SUPERVISING ACCOUNT MANAGEMENT OPERATIONS

(75) Inventors: Rebecca Lynn Siegel, Mt. Airy, MD (US); Jeffrey David Finocchiaro, Wilmington, DE (US); William Fredrick Herberger, Chadds Ford, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 780 days.

(21) Appl. No.: 09/901,078

(22) Filed: Jul. 10, 2001

(65) Prior Publication Data

US 2002/0046049 A1 Apr. 18, 2002

Related U.S. Application Data

(60) Provisional application No. 60/239,277, filed on Oct. 12, 2000.

(51) Int. Cl.
*G06Q 40/00* (2006.01)
(52) U.S. Cl. .................. 705/42; 705/39; 705/40; 705/41
(58) Field of Classification Search ............. 705/38–42, 705/37, 36, 35
See application file for complete search history.

(56) References Cited

U.S. PATENT DOCUMENTS

| | | | |
|---|---|---|---|
| 4,321,672 A | 3/1982 | Braun et al. |
| 4,355,372 A | 10/1982 | Goldberg et al. |
| 4,495,018 A | 1/1985 | Chen et al. |
| 4,633,397 A | 12/1986 | Macco |
| 4,694,397 A | 9/1987 | Vignola, Sr. |
| 4,722,054 A | 1/1988 | Fukushima |
| 4,745,468 A | 5/1988 | Von Kohor |
| 4,752,877 A | 6/1988 | Roberts |
| 4,774,664 A | 9/1988 | Gottardy |

(Continued)

FOREIGN PATENT DOCUMENTS

JP 7-152960 6/1995

(Continued)

OTHER PUBLICATIONS

Rial, Astrid., How to Monitor Collectors, Credit Card Management, Jul. 2000. vol. 13, Iss. 3: p. 65, 4 pgs.*

(Continued)

*Primary Examiner*—Hani Kazimi
(74) *Attorney, Agent, or Firm*—Hunton & William, LLP (57) ABSTRACT

A technique for tracking and managing account movement using a delinquency movement matrix is described. Customer Service Representatives or other agents may receive a promise for a payment amount for an account, after which the invention may record the baseline delinquency of the account at the time the promise is received, retrieve updated account information after a predetermined time period, and compare the baseline delinquency of the account to the updated delinquency of the account to determine the movement of that account through delinquency stages. The CSR staff may be awarded points based on the number of levels they are able to advance an account, for instance weighted or multiplied by the balance of the account. Other weightings by risk factors or other variables may be used. Because the CSR staff are incentivized to advance accounts to higher levels of currency, the risk of chargeoffs may be reduced and overall portfolio currency increased.

32 Claims, 6 Drawing Sheets

U.S. PATENT DOCUMENTS

| | | | |
|---|---|---|---|
| 4,797,911 A | 1/1989 | Marks et al. | |
| 4,812,628 A | 3/1989 | Boston | |
| 4,914,587 A | 4/1990 | Clouse | |
| 4,926,255 A | 5/1990 | Von Kohorn | |
| 4,932,046 A | 6/1990 | Ross et al. | |
| 4,948,174 A | 8/1990 | Thomason et al. | |
| 4,972,504 A | 11/1990 | Daniel, Jr. | |
| 4,974,878 A | 12/1990 | Josephson | |
| 5,041,972 A | 8/1991 | Frost | |
| 5,050,207 A | 9/1991 | Hitchcock | |
| 5,121,945 A | 6/1992 | Thomson et al. | |
| 5,157,717 A | 10/1992 | Hitchcock | |
| 5,179,584 A | 1/1993 | Tsumura | |
| 5,220,501 A | 6/1993 | Lawlor | |
| 5,225,978 A | 7/1993 | Peterson | |
| 5,259,023 A | 11/1993 | Katz | |
| 5,260,778 A | 11/1993 | Kauffman | |
| 5,287,269 A | 2/1994 | Dorrough | |
| 5,383,113 A | 1/1995 | Kight | |
| 5,402,474 A | 3/1995 | Miller | |
| 5,424,938 A | 6/1995 | Wagner | |
| 5,465,206 A | 11/1995 | Hilt et al. | |
| 5,483,444 A * | 1/1996 | Heintzeman et al. | 705/5 |
| 5,483,445 A | 1/1996 | Pickering | |
| 5,490,060 A | 2/1996 | Malec | |
| 5,523,942 A | 6/1996 | Tyler | |
| 5,532,920 A | 7/1996 | Hartrick | |
| 5,555,299 A | 9/1996 | Maloney et al. | |
| 5,559,855 A | 9/1996 | Dowens et al. | |
| 5,561,707 A | 10/1996 | Katz | |
| 5,570,465 A | 10/1996 | Tsakanikas | |
| 5,583,759 A | 12/1996 | Geer | |
| 5,594,791 A | 1/1997 | Szlam et al. | |
| 5,599,528 A | 2/1997 | Igaki | |
| 5,615,341 A | 3/1997 | Srikant et al. | |
| 5,652,786 A | 7/1997 | Rogers | |
| 5,659,165 A | 8/1997 | Jennings | |
| 5,684,863 A | 11/1997 | Katz | |
| 5,699,528 A | 12/1997 | Hogan | |
| 5,710,889 A | 1/1998 | Clark et al. | |
| 5,715,298 A | 2/1998 | Rogers | |
| 5,715,450 A | 2/1998 | Ambrose | |
| 5,727,249 A | 3/1998 | Powell | |
| 5,742,775 A | 4/1998 | King | |
| 5,745,706 A | 4/1998 | Wolfberg et al. | |
| 5,757,904 A | 5/1998 | Anderson | |
| 5,758,126 A | 5/1998 | Daniels et al. | |
| 5,761,647 A | 6/1998 | Boushy | |
| 5,765,142 A | 6/1998 | Allred et al. | |
| 5,787,403 A | 7/1998 | Randle | |
| 5,793,846 A | 8/1998 | Katz | |
| 5,794,221 A | 8/1998 | Egendorf | |
| 5,802,498 A | 9/1998 | Comesanas | |
| 5,802,499 A | 9/1998 | Sampson | |
| 5,815,551 A | 9/1998 | Katz | |
| 5,819,238 A | 10/1998 | Fernholz | |
| 5,826,241 A | 10/1998 | Stein | |
| 5,832,447 A | 11/1998 | Rieker | |
| 5,832,460 A | 11/1998 | Bednar | |
| 5,835,087 A | 11/1998 | Herz | |
| 5,835,580 A | 11/1998 | Fraser | |
| 5,835,603 A | 11/1998 | Coutts | |
| 5,842,211 A | 11/1998 | Horadan | |
| 5,862,223 A | 1/1999 | Walker | |
| 5,870,456 A | 2/1999 | Rogers | |
| 5,870,721 A | 2/1999 | Norris | |
| 5,870,724 A | 2/1999 | Lawlor | |
| 5,873,072 A | 2/1999 | Kight | |
| 5,875,437 A | 2/1999 | Atkins | |
| 5,884,032 A | 3/1999 | Bateman | |
| 5,884,288 A | 3/1999 | Chang | |
| 5,890,140 A | 3/1999 | Clark et al. | |
| 5,897,625 A | 4/1999 | Gustin | |
| 5,899,982 A | 5/1999 | Randle | |
| 5,903,881 A | 5/1999 | Schrader | |
| 5,920,847 A | 7/1999 | Kolling et al. | |
| 5,923,745 A | 7/1999 | Hurd | |
| 5,940,811 A | 8/1999 | Norris | |
| 5,943,656 A | 8/1999 | Crooks | |
| 5,953,406 A | 9/1999 | LaRue et al. | |
| 5,966,695 A | 10/1999 | Melchione et al. | |
| 5,966,698 A | 10/1999 | Pollin | |
| 5,970,467 A | 10/1999 | Alavi | |
| 5,974,396 A | 10/1999 | Anderson | |
| 5,978,780 A | 11/1999 | Watson | |
| 5,987,435 A | 11/1999 | Weiss | |
| 5,991,750 A | 11/1999 | Watson | |
| 5,995,942 A | 11/1999 | Smith et al. | |
| 5,995,948 A | 11/1999 | Whitford | |
| 6,006,207 A | 12/1999 | Mumick et al. | |
| 6,016,344 A | 1/2000 | Katz | |
| 6,016,482 A | 1/2000 | Molinari et al. | |
| 6,018,722 A | 1/2000 | Ray et al. | |
| 6,026,370 A | 2/2000 | Jermyn | |
| 6,029,139 A | 2/2000 | Cunningham et al. | |
| 6,032,125 A | 2/2000 | Ando | |
| 6,038,552 A | 3/2000 | Fleischl et al. | |
| 6,049,782 A | 4/2000 | Gottesman et al. | |
| 6,055,510 A | 4/2000 | Henrick | |
| 6,058,378 A | 5/2000 | Clark et al. | |
| 6,070,147 A | 5/2000 | Harms et al. | |
| 6,078,892 A | 6/2000 | Anderson et al. | |
| 6,088,685 A | 7/2000 | Kiron | |
| 6,098,052 A | 8/2000 | Kosiba et al. | |
| 6,100,891 A | 8/2000 | Thorne | |
| 6,101,486 A | 8/2000 | Roberts et al. | |
| 6,148,293 A | 11/2000 | King | |
| 6,151,584 A | 11/2000 | Papierniak et al. | |
| 6,157,924 A | 12/2000 | Austin | |
| 6,212,178 B1 | 4/2001 | Beck et al. | |
| 6,226,623 B1 | 5/2001 | Schein et al. | |
| 6,230,287 B1 | 5/2001 | Pinard et al. | |
| 6,233,332 B1 | 5/2001 | Anderson et al. | |
| 6,233,566 B1 | 5/2001 | Levine | |
| 6,278,981 B1 | 8/2001 | Dembo | |
| 6,301,567 B1 | 10/2001 | Leong et al. | |
| 6,304,653 B1 | 10/2001 | O'Neil et al. | |
| 6,304,858 B1 | 10/2001 | Mosler | |
| 6,321,212 B1 | 11/2001 | Lange | |
| 6,338,047 B1 | 1/2002 | Wallman | |
| 6,393,409 B2 | 5/2002 | Young | |
| 6,405,179 B1 | 6/2002 | Rebane | |
| 6,415,267 B1 | 7/2002 | Hagan | |
| 6,418,419 B1 | 7/2002 | Nieboer | |
| 6,430,545 B1 | 8/2002 | Honarvar | |
| 6,456,983 B1 * | 9/2002 | Keyes et al. | 705/36 |
| 6,480,850 B1 | 11/2002 | Veldhuisen | |
| 6,513,018 B1 * | 1/2003 | Culhane | 705/35 |
| 6,513,019 B2 | 1/2003 | Lewis | |
| 6,553,113 B1 | 4/2003 | Dhir et al. | |
| 6,578,015 B1 | 6/2003 | Haseltine et al. | |
| 6,658,393 B1 | 12/2003 | Basch et al. | |
| 6,798,413 B1 * | 9/2004 | Tracey et al. | 345/440 |
| 6,804,346 B1 | 10/2004 | Mewhinney | |
| 2001/0032158 A1 | 10/2001 | Starkman | |
| 2001/0032159 A1 | 10/2001 | Starkman | |
| 2001/0032176 A1 | 10/2001 | Starkman | |
| 2001/0034682 A1 | 10/2001 | Knight et al. | |
| 2001/0042034 A1 | 11/2001 | Elliott | |
| 2001/0044293 A1 | 11/2001 | Morgan | |
| 2001/0047489 A1 | 11/2001 | Ito et al. | |
| 2002/0026394 A1 | 2/2002 | Savage et al. | |
| 2002/0059141 A1 | 5/2002 | Davies et al. | |
| 2003/0101119 A1 | 5/2003 | Persons et al. | |

| | | | |
|---|---|---|---|
| 2003/0163403 | A1 | 8/2003 | Chen et al. |
| 2003/0208441 | A1 | 11/2003 | Poplawski et al. |

FOREIGN PATENT DOCUMENTS

| | | |
|---|---|---|
| WO | WO 01/86524 | 11/2001 |
| WO | WO 0186524 A2 | 11/2001 |

OTHER PUBLICATIONS

PCT-International Search Report dated Sep. 12, 2002 for Application No. PCT/US01/31517.

Anonymous, Delivering the Right Information to the Right Resource or Every Customer, Interaction; Intelligent Callrouter, www.geotel.com/solutions/icr, 1998.

Global Corruption Report 2004, Transparency International, Pluto Press, www.globalcorrup.com, ISBN 07453 2231; Jun. 26, 2005.

The Customer Interaction Specialists, Computer Telephony Solutions, Internet, May 25, 1999.

Delivering the Right Information to the Right Resource or Every Customer Interaction; Intelligent Callrouter, www.geotel.com/solutions/icr/default/htm, 1998, 1 page.

Keep the Change Savings Service, Bank of America, Retrieved from the internet on Jan. 27, 2006 at <https://www.bankofamerica.com/deposits/checksave/apps/ktc/ktc_terms.cfm>.

Computer Telephony Solutions, The Customer Interaction Specialists, Computer Telephony Solutions, Internet, May 25, 1999.

* cited by examiner

SYSTEM AND METHOD FOR SUPERVISING ACCOUNT MANAGEMENT OPERATIONS

This application claims priority from U.S. Provisional Application Ser. No. 60/239,277 filed Oct. 12, 2000, assigned or under obligation of assignment to the same entity as this application, and which application is incorporated by reference herein.

FIELD OF THE INVENTION

The invention relates to the field of financial support services, and in particular, to the use of advanced account metrics to manage, evaluate and reward customer service representatives or other service agents performing account management in a bank or other institution.

BACKGROUND OF THE INVENTION

Customer Service Representatives (CSRs) are employed by banks and other companies to handle inquiries by account holders regarding their accounts, and to contact account holders regarding market promotions, delinquent accounts and other programs. The CSRs may handle credit card accounts, mortgages, personal loan or other types of accounts.

When contacting delinquent account holders, for instance, CSRs are often directed to try to obtain a promise from the account holders to pay a certain amount of the balance due. Each CSR may be made responsible for a certain number of late, underpaid or otherwise delinquent or noncurrent accounts. For example, a CSR may be assigned a set of delinquent or other accounts, and may have inbound or outbound calls on those accounts distributed to them via an automated call engine while on shift. The amount that the account holders promise to pay may be determined by discussions between the account holder and the CSR servicing the account.

Large banks and other organizations may spend significant resources, sometimes millions of dollars per year, to staff and employ CSRs around the clock in such concerted service and collection efforts, at call centers, Web centers and other facilities. However, it is difficult to measure whether this deployment of CSRs is beneficial to the bank, or how productive the efforts of the call center or other CSR facility are in terms of improving account performance.

One known method of evaluating collection operations is to measure the percentage of promises to pay by delinquent account holders that are kept within a specified window of time. Another method is to measure the average size of payments which are fulfilled. A third method is to measure the percentage of promises kept per hour worked by CSRs.

However, these and other methods of evaluating CSRs and other personnel encourage those personnel to emphasize behaviors that may not be optimal to the bank or other institution. For instance, one incentive these conventional measurement schemes present to CSRs is to request promises for payment sizes that are smaller than what an account holder may be able to pay. Since an account holder is more likely to make good on a smaller payment, CSRs may tend to be satisfied with promises for smaller payments so that there is more likelihood that the payment will be made. Since the CSRs may receive bonuses or other awards based on the number or percentage of promises to pay that are kept or the number of payments kept per hour worked, regardless of amount, securing the smaller payments may be advantageous to the CSR.

Although a high percentage of promised payments made appears efficient, and may make the CSR appear productive, the total amount of the payments made or the payments made to each particular account may not be fully advantageous for the bank or other institution on an overall basis.

Even when this effect is somewhat taken into account by using a metric such as average payment size, one large up front payment could raise the average for a given set of accounts handled by a CSR. Securing such a payment may induce the CSR to be satisfied with smaller payment promises or forbearance for the remaining balance on that account, or on other accounts for a measurement period when greater amounts could be secured.

There are moreover further account considerations not addressed by promise-kept or averaging techniques. If the amount of the payments made on account are generally small, such as, for example, a quarter or half of the amount that is owed on the balance for the last month, receiving the payment may not change the delinquency status of the account. That may not serve the goals of the bank or other institution.

Credit cards for instance are unsecured loans. Under financial regulations, if an account is delinquent for a certain number of months, a bank may no longer be able to record or list that account as an asset. Thus, receiving only a portion of one month's regular calculated payment may not be beneficial to a bank if, even after the payment, the account may remain delinquent by the same number or a greater number of months.

In the collections industry accounts may consequently be classified or staged, for delinquency purposes, in categories sometimes called "buckets". Each bucket may represent the number of months that an account is delinquent. For example, the accounts in "Bucket 0" are not delinquent (current), the accounts in "Bucket 1" are one month delinquent, and so forth. Experience has shown that a majority of the accounts in Bucket 1 or Bucket 2 are likely to move back in to Bucket 0 within a relatively short time, and be restored to current status.

However, when an account moves beyond Bucket 2, the account is empirically less likely to move back to Bucket 0 and may be more likely to descend into lower levels of delinquency. Therefore, it is be beneficial to a bank or other entity to efficiently move accounts to lower numbered buckets, that is, to a better state of currency. The bank may then maintain the accounts as recordable assets.

For example, if a bank can not list an account that is over seven months delinquent as an asset, receiving a quarter or a half of a month's payment on such an account may not be enough to change the account's delinquency status. The account will thus progress past the maximum delinquency allowance, so that the bank may not be able to record that account as a receivable asset. At that stage some banks may send or sell the account to a separate collections facility, and the account may have to be written off for tax, regulatory or other purposes.

Thus, a partial payment received by the bank which does not move the account up to a less-delinquent status may not help the institution's bottom line, although it may make the CSR seem efficient and help the CSR earn a bonus or other incentive under promise-kept or other conventional schemes.

Although certain banks have tracked the aggregate movement of accounts through different levels of delinquency in the past, movement of accounts through buckets has not been used as a management tool at least at the level of CSRs or other employees. Thus, managers have not been able to assess the individual impact that CSRs, teams of CSRs or other units have on so-called roll rates (movement of accounts between buckets) and other aspects of financial performance. Other drawbacks exist.

SUMMARY OF THE INVENTION

The invention overcoming these and other problems in the art relates to a system and method for supervising account management operations, which in one regard are capable of tracking and quantifying account movement through different stages of delinquency at the level of individual CSRs, groups of CSRs and other organizational levels. The invention in one respect includes a method and apparatus configured to record account movement in a delinquency movement matrix (DMM), and other data and reporting structures. The invention may permit managers to monitor and model the performance of collection and other operations according to results such as balances shifted upward in currency, and other metrics which may be most functionally meaningful to the organization's goals.

According to the invention, account tracking information may be obtained from a set of data tables for a predetermined window of time following receipt of a promise to pay. Information inserted into that table or other record may include an account identifier, updated account information, chargeoff information, payment amount and other information. A server or other resource may generate a report indicating the movement of the accounts between buckets for predefined accounts or groups of accounts, CSRs, teams of CSRs or other units based on the payment history table and other information.

The invention may thus generate one or more metrics related to the accounts in the institution's portfolio, including to track how accounts move through different levels of delinquency over time. The invention may record data reflecting the performance of individual CSRs, in one embodiment by multiplying the number of buckets or levels moved by the account balance so moved.

In another regard the invention relates to data processing and other equipment, software, logic and other resources configured to track the movement of accounts through the different thresholds of delinquency, as well as to generate reports and other information at the level of individual CSRs, teams of CSRs, groups of teams of CSRs and other hierarchical levels in a scalable fashion.

BRIEF DESCRIPTION OF THE DRAWINGS

The invention will be described with reference to the accompanying drawings, in which like elements are referenced with like numerals.

DETAILED DESCRIPTION OF PREFERRED EMBODIMENTS

Figure 1:
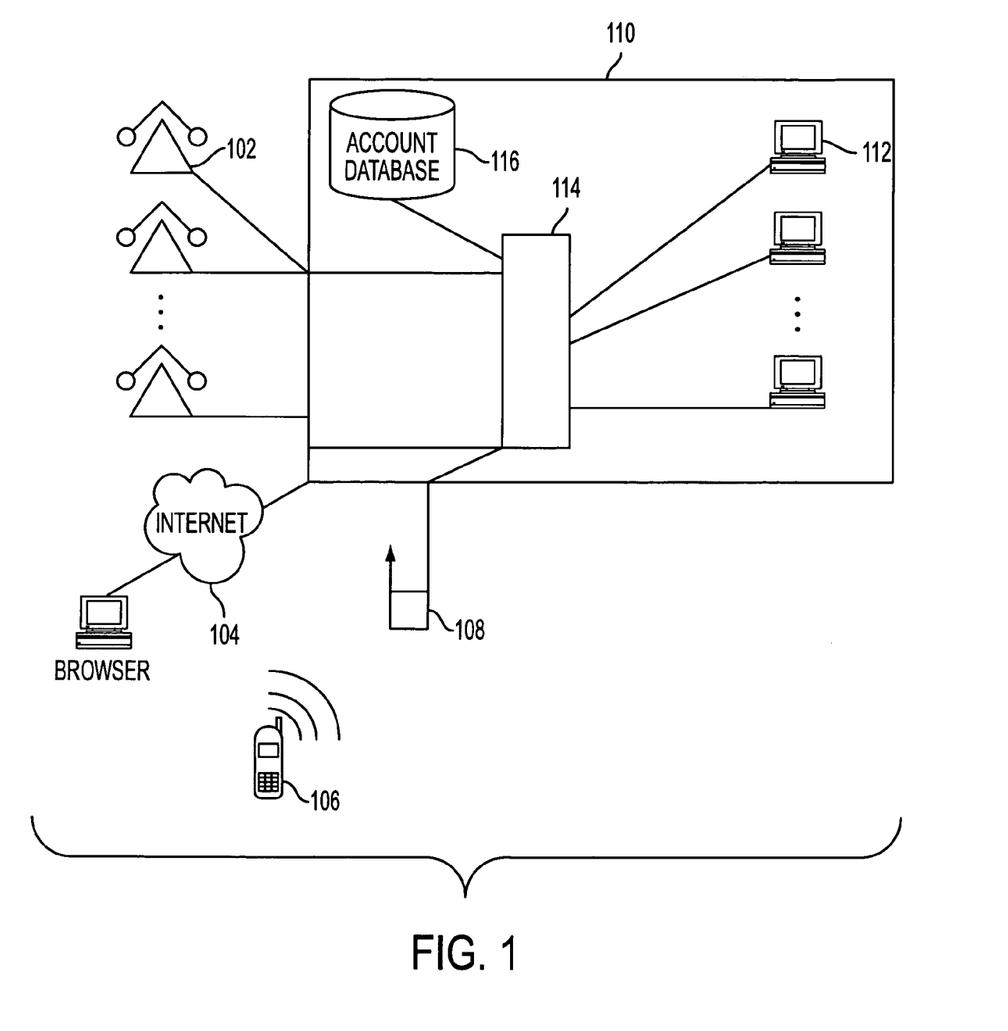
FIG. 1 shows an illustrative network architecture in which the invention may be operated.

As illustrated in FIG. 1, according to an embodiment of the invention a promise for payment on an account may generally be negotiated by CSRs or other employees, agents or other personnel at an operations facility 110 acting on behalf of an account holding or other institution. The promise may be received from one or more account holders who may be in contact with the operations facility 110 via dial-up or other telephone connections 102, Internet connections 104, mobile connections 106 such as a mobile telephone communicating with a mobile switch 108, or other channels. In the architecture illustrated in FIG. 1, the CSRs or other personnel may operate telephone equipment and one or more agent workstations 112 or other equipment to enter and retrieve data and manage accounts and other information.

The agent workstations 112 may communicate with an operations server 114 to record account information in the account database 116, generate reports and generally manage collections and other operations. It will be understood that although operations facility 110 is illustrated as a single site, in different implementations of the invention one or more resources may be distributed to different data centers, call centers of other facilities.

As illustrated, negotiations thus may be conducted and payment promises may be made to a CSR or other agent over the telephone, the Internet or any other communication medium, for instance at a call center, Internet center, in person at a banking or other office, or at or through other local or remote locations and facilities.

Figure 4:
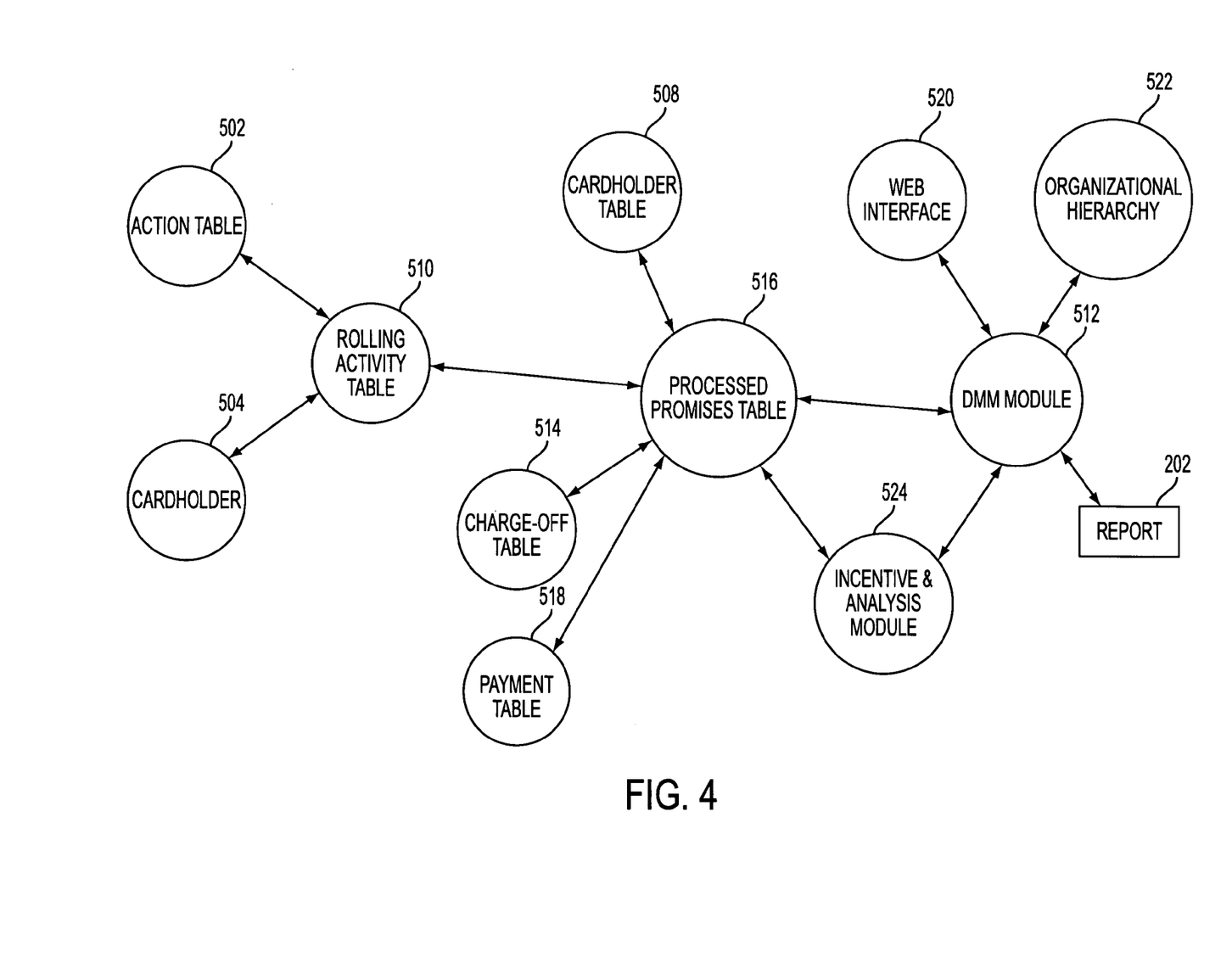
FIG. 4 shows an illustrative network architecture in which the invention may be operated, in another regard.

As shown for instance in the architecture of FIG. 4, which illustrates a data flow of the invention in another regard, once received the CSR may record the promise to pay in an action table 502, for instance using workstation 112 communicating with operations server 114. The action table 502 may contain a record of all the work done by CSRs on a daily or other basis including promises obtained, promise amount, CSR identification information and other fields.

The action table 502 may communicate with a rolling activity table 510 reflecting overall activity related to accounts, and communicating with other tables and resources. The invention may retrieve the records of each account added to the rolling activity table 510 since the last retrieval, including records reflecting payment and other activity by or from cardholder 504.

The invention may retrieve the baseline delinquency of each account at the time the promise is received from a cardholder table 508. The baseline delinquency may be recorded with the account and promise information in the rolling activity table 510 or other record.

According to the invention the movement of accounts across different levels of delinquency may be tracked after a predetermined time period. For example, the accounts for which promises have been received may be tracked after 10 days. Other periods of time may be used. A period of time less than a normal account statement period may be preferable, so that movements to higher account status may be reflected within a regular reporting period.

The invention may check to see if the account remains present in the cardholder table 508 after the predetermined time period. If the account is present in the cardholder table 508, the invention may retrieve updated account information from the cardholder table 508 and compare the baseline delinquency of the account to the updated delinquency of the account. If the account is not present, processing of that account may terminate.

In this regard, the network of the invention may obtain the current cardholder table 508 or other information from a separate data warehouse or processing facility, such as via nightly or other periodic download from the commercial First Data Resource or other data service, which may be in CD191 or other file formats. Other data sources, formats and infrastructures are possible.

If an account is not present in the cardholder table 508 the network of the invention may check if the account has been charged off (i.e., dropped from the account database 116 or other records because the delinquency period has extended beyond the maximum allowed delinquency period). If the account has been charged off, the bucket for the account may be set to the highest bucket or delinquency rating number plus one. For example, if the maximum allowable period of delinquency is 7 months, the highest bucket number may be 8 indicating charge off.

If the account has not been charged off, the bucket for the account may be set to 0, indicating that the account is assumed to have become current. Other flags and conditions are possible. Once charged off, accounts may be stored in charge-off table 514.

The network of the invention may obtain payment information from a payment table 518 for a predetermined time period following receipt of the promise. The invention may insert each of the accounts tracked, the updated account information for each account, chargeoff information and the payment information for each account into a processed promises table 516 or other record reflecting which promises on payment have been fulfilled, which have not been fulfilled, have been rescheduled, and other information.

At daily, weekly or other time points, the network of the invention may receive information from the rolling activity table 510, processed promises table 516 and other resources to feed a delinquency movement matrix module 512. The delinquency movement matrix module 512 may generate reports, including reports indicating the transition of different accounts through different currency levels for a time frame of interest. The output of the delinquency movement matrix furthermore may include results derived from individual CSRs, teams of CSRs, groups of teams of CSRs, lines of business, divisions, sites or other units of the processing institution.

The delinquency movement matrix module 512 may also receive information from, or provide access to, other resources including a web interface 520 and an organizational hierarchy 522 to generate selectable reports. Web interface 520 may provide CSRs, supervisors, accounting personnel or other authorized employees, agents or others to view, search, update or otherwise manipulate the delinquency movement matrix 512 and reports generated thereby, or associated information. The Web interface 520 may be accessible through, for instance, dial-up connections, network-enabled wireless or other connections. Different implementations of the Web interface 520 may incorporate security features such as passcode, biometric, Secure Socket Layer (SSL) or other security techniques to regulate access privileges, e-mail availability and other resources.

The delinquency movement matrix module 512 may likewise communicate with the organizational hierarchy 522, such as a database of a corporation's CSRs or other employees, groups, teams, locations, divisions, subscribers or other units or assets of that organization. Interrogation of the organizational hierarchy 522 may permit generation of team-level, division-level or other combined reports on account management and service performance.

Figure 6:
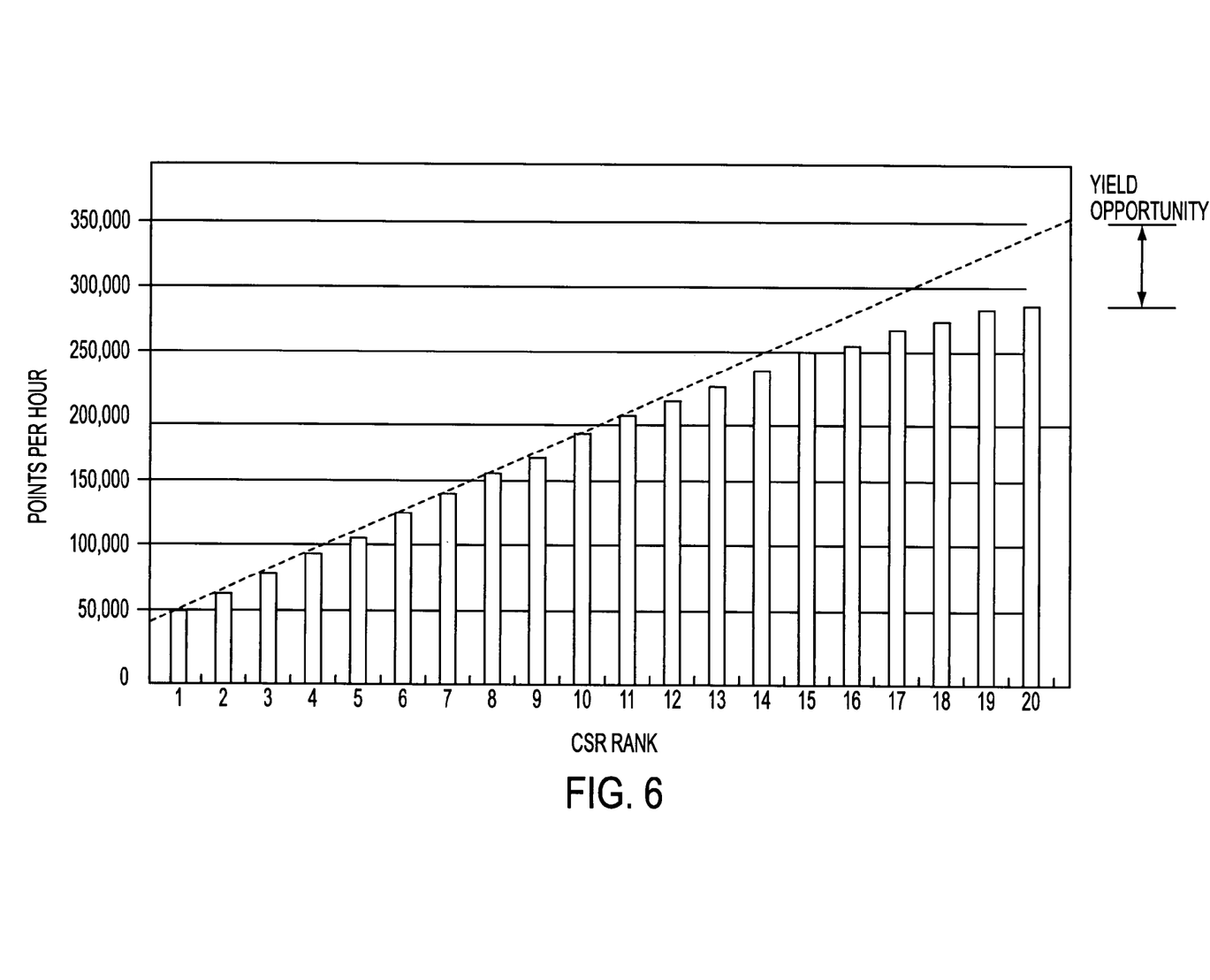
FIG. 6 illustrates a cumulative contribution curve, illustrating how individual CSRs or other agents may contribute to total balance-bucket or other recoveries or metrics on a running basis, according to an embodiment of the invention.

In one regard, the ability to generate multilevel reports may be exploited to produce output such as the contribution curve illustrated in FIG. 6, which shows the running total of weighted balances moved as individual CSRs, teams of CSRs or other resources are added to service deployment. Tapering contributions as shown in that figure may indicate a yield opportunity to the management of the organization. Similarly, the delinquency movement matrix module 512 may communicate with an incentive and analysis module 524, which may record CSR, team, division or other performance data, based on weighted balance-moved, risk factor or other metrics. Performance awards, compensation and other management incentives may be based on the calculations carried out by the incentive and analysis module 524 and other information.

The information collected by the delinquency movement matrix 512 module may be interrogated to generate reports. Those reports may be built to depict the movement of the accounts between buckets for predefined sets of accounts, such as the report 202 illustrated in FIG. 2. The report 202 may include a balances moved table illustrating the accounts (or amount of money) in each bucket after the predetermined window of time to test for fulfillment of promises made.

Figure 2:
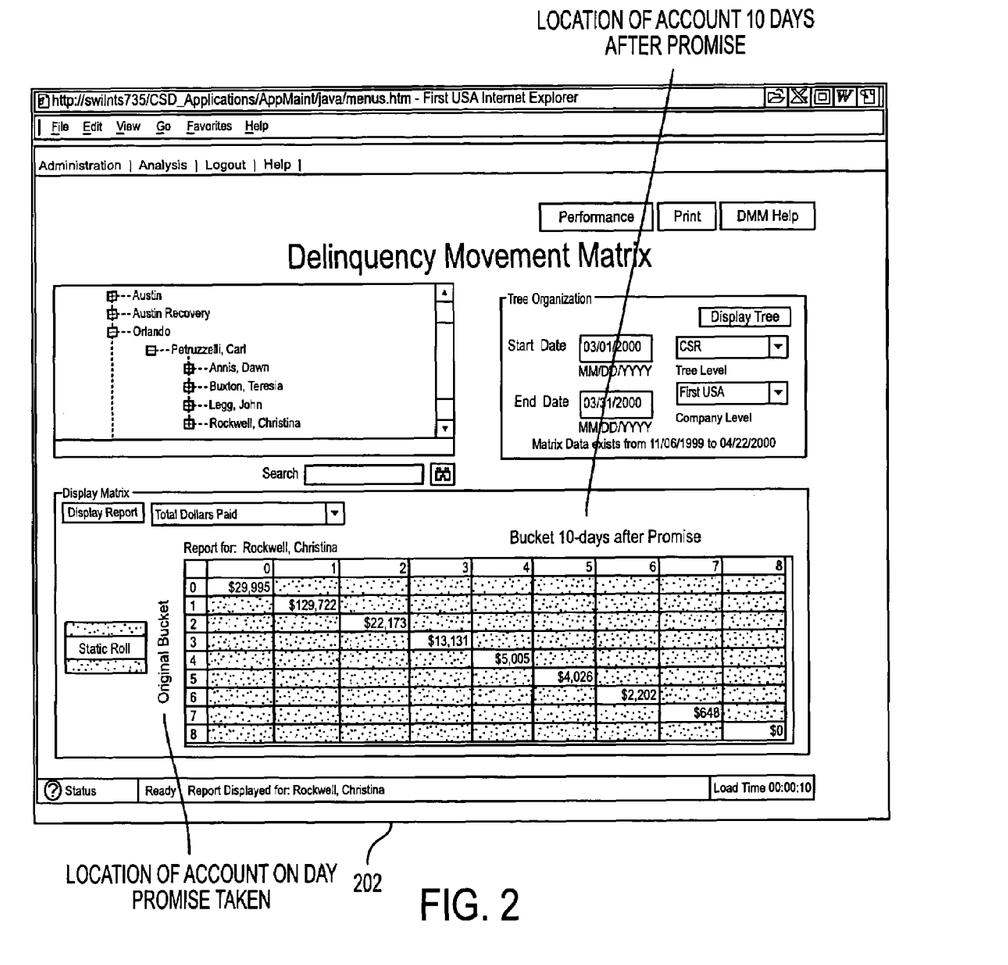
FIG. 2 illustrates a report generated according to an embodiment of the invention showing movement of consumer accounts through various delinquency status categories.

The report 202 may be divided into fields representing which delinquency buckets the accounts were in at the time the promises were made and encoded to illustrate whether the accounts rolled backward (went from a higher bucket number to a lower bucket number such as, for example, from Bucket 1 to Bucket 0), rolled forward (went from a lower bucket number to a higher bucket number such as, for example, went from Bucket 2 to Bucket 3) or remained static.

The report 202 and other tables, charts and data generated by the invention may in one regard be used to manage, provide incentives to and reward CSRs or other staff. In one embodiment, the CSRs may be allocated points based on the number of buckets that an account has moved over a given cycle time. That point total may be weighted or multiplied by the amount of the account or other parameters.

For example, if a CSR or other agent is able to move a $5,000 account from Bucket 2 to Bucket 1 by successfully securing a promise to pay arrears which is then fulfilled within one cycle of time in one embodiment, the CSR may be awarded 1×5,000=5,000 points. If a CSR or other agent is able to move a $2,000 account from Bucket 3 to Bucket 0 by successfully securing a promise to pay a balance in full which is then fulfilled within one cycle time, the CSR may be awarded 3×2,000=6,000 points.

On the other hand, if a CSR or other agent successfully secures a promise to pay which is then fulfilled but which does not cause a change in bucket status, the CSR may be awarded zero points. Depending on implementation, the CSRs or other agents may receive negative points if an account for which they are responsible enters a deeper stage of delinquency due to failure to receive further payments during the cycle period. A points chart illustrating points which may be awarded to CSRs is shown in the report 202 of FIG. 2.

Other weightings, scalings or point allocations are possible. For instance, in another embodiment the balance-bucket product may be multiplied by a risk factor rating to allow for the fact that some accounts, for instance higher-bucket denominations, present a greater risk of default than others. The risk factor rating may be expressed as a percentage or other numerical estimate that the account will move into default, or deeper into default, during the next regular statement period. If expressed as a percentage, one illustrative risk factor weighting may include the multiplying of the balance-bucket product by the percentage risk, so that CSRs may be awarded a greater number of net points for moving an account at for example 90% risk than an account at say 10% risk, for the same balance-bucket product.

In another embodiment, the balance-bucket product may be further weighted by an outcome factor, reflecting the fact that certain call outcomes may be more desirable to the bank than others. For instance, collecting the entire delinquent balance is generally a better solution than "settling" on the account, that is, writing off a portion of the delinquent balance in exchange for a payment for the remainder. Without an outcome scaling factor, both outcomes could be treated equally. When applied, the outcome factor may modify the points earned, with the most optimal outcomes being associated with the highest scaling factors. CSRs successfully negotiating optimal call outcomes may receive higher point totals than those who negotiate sub-optimal results.

As noted, the predetermined window of time over which the promise to pay may be fulfilled may be 10 or another number of days, generally designed to encourage prompt reconciliation of payments. In one embodiment, telephonic check payments via the Automated Clearing House (ACH) may be processed on the same or a different call with the account holder, or credit card or other payments may be processed in different implementations to help ensure that payments are credited within the 10 day or other window.

The invention may thus be used as a tool by and for CSRs, managers and others to monitor how they are performing and how their oversight affects the overall account posture of the bank or other entity. The invention may likewise be used as a tool for management to identify improper promise-taking, and more intelligently target CSR training. Reports may be generated on the account movements achieved by individual CSRs, groups of CSRs, divisions of an organization or other units or subunits of the operator.

For instance, CSRs who work mainly with certain buckets may be grouped together and compared to each other, so that comparisons of performance are made more fair. For example, a backward roll from Bucket 7 to Bucket 6 may be more difficult to accomplish than a backward roll from Bucket 2 to Bucket 1 so that only Bucket 7 CSRs may be compared to other Bucket 7 CSRs.

In different embodiments, different CSR groups may be provided with different modes of contacting account holders. For instance, for account holders having relatively small account balances at small degrees of delinquency, say Bucket 1, the CSR may operate an automated telephone dialing system which automatically calls customers at home or other telephone numbers, from a database. When the call is not answered, the automated dialing system may proceed to a next number generated by the database.

Conversely, for relatively large accounts at deeper stages of delinquency, CSRs may operate telephones to dial available numbers manually, at times and frequencies of their discretion in order to facilitate constructive contact and negotiation with the consumer.

Figure 5:
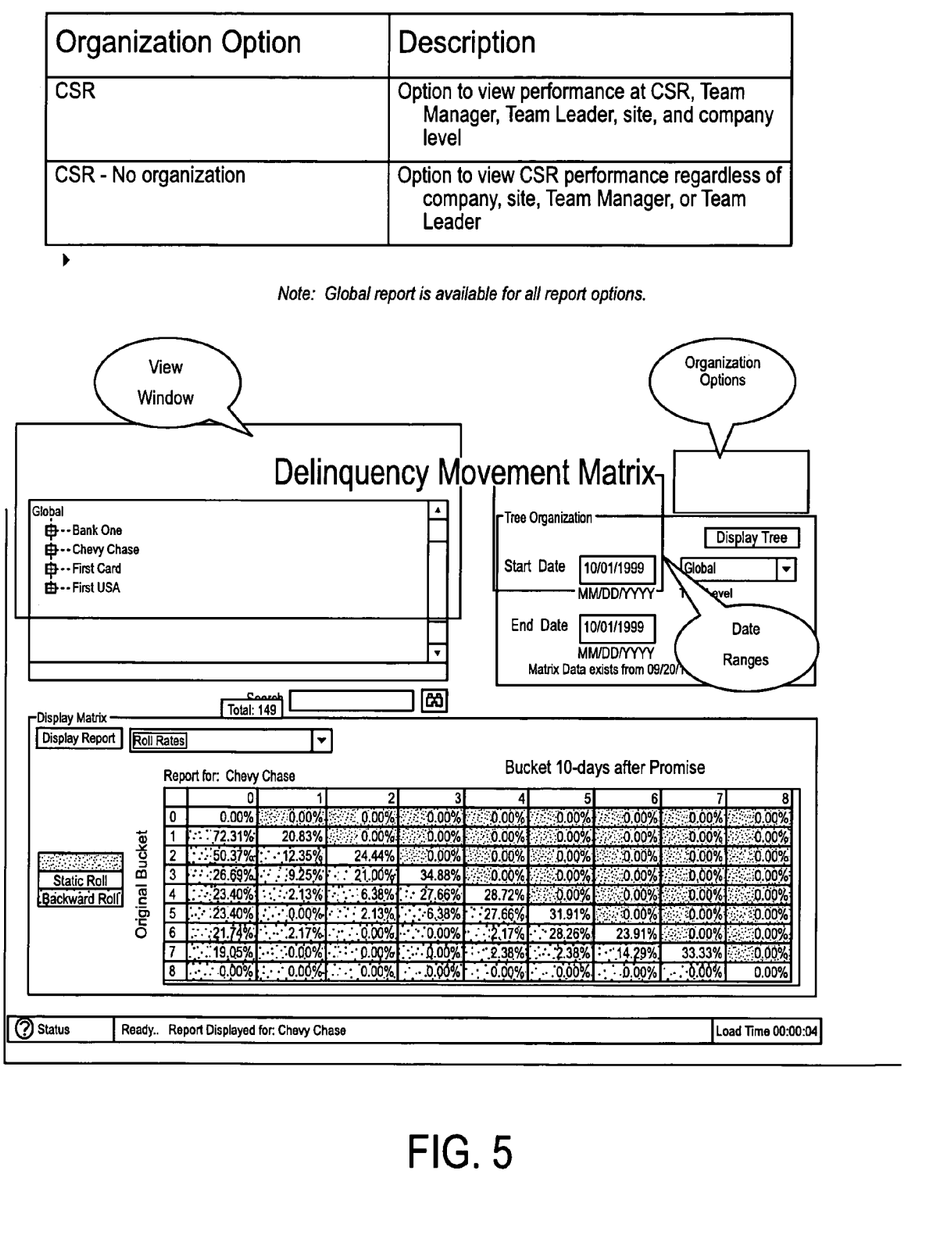
FIG. 5 illustrates a report generated by an embodiment of the invention, in another regard.

The CSRs may likewise be divided into teams, and aggregate data on those teams may be analyzed and used for evaluation of teams or groups of teams against each other. The invention may likewise be used to analyze company and generate reports on an aggregate level, for divisions or the entire bank or other institution. For instance, individual banks or credit card brands operated by an overall entity may be individually analyzed, as for instance illustrated in FIG. 5.

Figure 3:
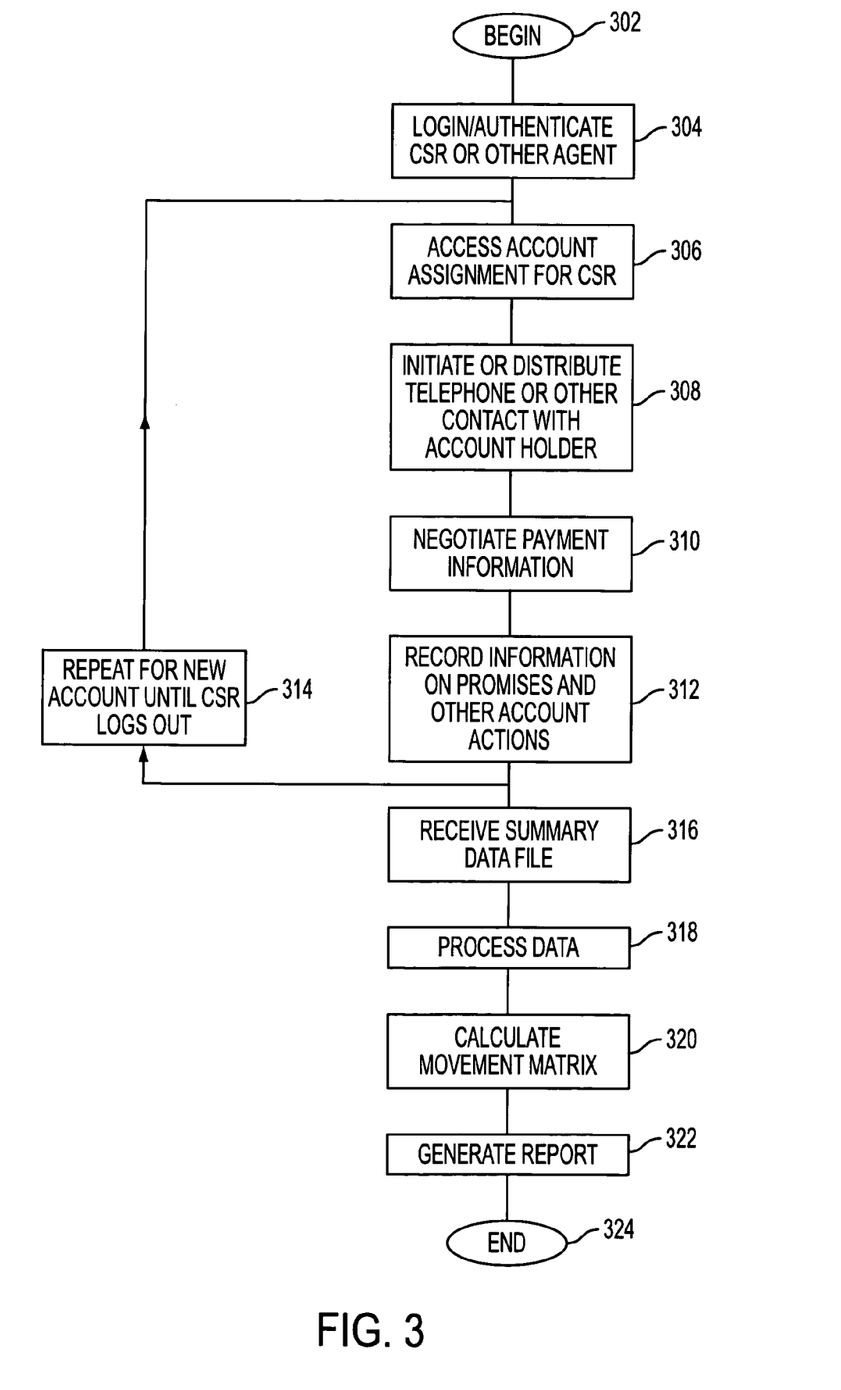
FIG. 3 illustrates a flowchart of account processing according to an embodiment of the inventions.

Overall processing of account management is illustrated in FIG. 3. In step 302, processing begins. In step 304, the CSR or other agent may log into an agent workstation 112 or other client and be authenticated for use. In step 306, the accounts assigned to that CSR may be accessed, for instance via database. In step 308, the telephonic, Web or other contacts with account holders are distributed or initiated to a CSR, for instance via an automatic call distributor (ACD), an automated dialing engine (power dialer or other platform) or Web messaging. In step 310, the CSR or other agent may negotiate payment promises, schedules or other information with the account holder or other customer. In step 312, information related to the promises and other account actions may be recorded in the rolling activity table 510 or other resources. In step 314, the CSR may repeat the sequence of customer contact, negotiation and recording of payment promises, schedules and other information until the CSR logs out, such as at the end of a shift.

In step 316, the delinquency movement matrix module 512 may receive a summary data file, such as from a data reporting bureau or other source. In step 318, the delinquency movement matrix module 512 may process data from a variety sources, including any summary data file, the processed promises table 516, the organizational hierarchy 522 and other sources. In step 320, the delinquency movement matrix module 512 may calculate a movement matrix and other outputs reflecting account transitions. In step 322, the delinquency movement matrix module 512 may generate a report 202, such as the type illustrated in FIG. 2. In step 324, processing ends.

The foregoing description is illustrative, and adaptations of the invention will occur to persons skilled in the art. For instance, while the invention has been described as generally operating to generate individual reports, multiple reports may be generated, separated, merged or otherwise combine, for instance for separate or related entities. Likewise, while the invention has been generally been described in terms of the tracking of credit accounts, other types of accounts or relationships may be managed according to the invention. The scope of the invention is intended to be limited only by the following claims.

What is claimed is:

1. A computerized method for tracking accounts managed by an account agent or agents, the method comprising:
   a) receiving a baseline status of an account from an account database;
   b) retrieving an updated status of the account from an account database after a predetermined period;
   c) comparing the baseline status to the updated status, wherein the comparing operation is performed using a processor;
   d) generating an account metric based on the step (c) of comparing the baseline status to the updated status, the account metric including a weighting according to at least a change in level of delinquency of the account, wherein the generating operation is performed using the processor;
      wherein the step (d) of generating an account metric comprises a step (e) of multiplying an account balance by the change in level of delinquency of the account;
      wherein the change in level of delinquency of the account comprises monthly buckets designating a number of months behind current for the account; and
   f) assigning a score to the account agent or agents based on the account metric, wherein the assigning operation is performed using the processor and wherein the score is used to evaluate the account agent or agents.

2. The method of claim 1, wherein the step (d) of generating an account metric comprises a step f) of multiplying an account balance by a risk rating.

3. The method of claim 1, wherein the step (d) of generating an account metric comprises a step f) of multiplying an account balance by an outcome rating.

4. The method of claim 1, wherein the account comprises a financial account.

5. The method of claim 4, wherein the financial account comprises a credit account.

6. The method in claim 5, wherein the credit account comprises a revolving credit account.

7. The method in claim 4, wherein the credit account comprises a mortgage account.

8. The method in claim 1, further comprising a step f) of aggregating the account metric for each of a plurality of accounts to generate an aggregate metric, wherein the aggregating operation is performed using the processor.

9. The method in step 8, wherein the aggregate metric is stored in a database.

10. The method of step 9, wherein the database is interrogatable to generate reports.

11. The method of claim 10, further comprising a step g) of accessing the database and an organizational database through a network interface to generate the reports.

12. The method of claim 11, wherein the reports comprise at least one of agent reports, team reports, group reports, division reports, and corporate reports.

13. The method of claim 1, wherein the predetermined period comprises a period less than a statement period for the account.

14. The method of claim 13, wherein the account comprises a revolving credit account and the predetermined period comprises less than 15 days.

15. The method of claim 1, further comprising a step f) of presenting a network interface to view the account metric.

16. The method of claim 15, wherein the network interface comprises a Web page.

17. A system for tracking accounts managed by an account agent or agents, the system comprising:
  an interface to a data source transmitting a baseline status of an account and an updated status of the account after a predetermined period;
  a processor, communicating with the interface, the processor being adapted to:
    compare the baseline status to the updated status to identify a change in level of
    delinquency of the account
    generate an account metric, the account metric including a weighting according to
    at least the change in level of delinquency of the account;
      wherein the account metric is generated by multiplying an account balance by the change in level of delinquency of the account;
      wherein the change in level of delinquency of the account comprises monthly buckets designating a number of months behind current for the account; and
    assign a score to the account agent or agents based on the account metric, wherein
      the score is used to evaluate the account agent or agents.

18. The system of claim 17, wherein the processor is further adapted to generate the account metric by multiplying an account balance by a risk rating.

19. The system of claim 17, wherein the processor is further adapted to generate the account metric by multiplying an account balance by an outcome rating.

20. The system of claim 17, wherein the account comprises a financial account.

21. The system of claim 20, wherein the financial account comprises a credit account.

22. The system of claim 21, wherein the credit account comprises a revolving credit account.

23. The system of claim 20, wherein the credit account comprises a mortgage account.

24. The system of claim 17, wherein the processor is further adapted
  to generate an aggregate metric by aggregating the account metric for each of a plurality of accounts to generate the aggregate metric.

25. The system of step 24, further comprising a database storing the aggregate metric.

26. The system of claim 25, wherein the database is interrogatable to generate reports.

27. The system of claim 26, further comprising an interface to an organizational database, the processor being further adapted to communicate with the database and the organizational database to generate the reports.

28. The system of claim 26, wherein the reports comprise at least one of agent reports, team reports, group reports, division reports, and corporate reports.

29. The system of claim 17, wherein the predetermined period comprises a period less than a statement period for the account.

30. The system of claim 29, wherein the account comprises a revolving credit account and the predetermined period comprises less than 15 days.

31. The system of claim 17, further comprising a network interface to view the account metric.

32. The system of claim 31, wherein the network interface comprises a Web page.

* * * * *